(12) United States Patent
Jeon et al.

(10) Patent No.: US 8,586,235 B2
(45) Date of Patent: Nov. 19, 2013

(54) BATTERY MODULE

(75) Inventors: Yoon-Cheol Jeon, Yongin-si (KR); Tae-Yong Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1669 days.

(21) Appl. No.: 11/497,013

(22) Filed: Jul. 31, 2006

(65) Prior Publication Data

US 2007/0026305 A1  Feb. 1, 2007

(30) Foreign Application Priority Data

Jul. 29, 2005 (KR) .................. 10-2005-0069442
Jul. 29, 2005 (KR) .................. 10-2005-0069482

(51) Int. Cl.
*H01M 2/10* (2006.01)
*H01M 2/00* (2006.01)
*H01M 2/16* (2006.01)

(52) U.S. Cl.
USPC .................... 429/186; 429/163; 429/247

(58) Field of Classification Search
USPC .......... 429/90, 122, 123, 148, 162, 163, 186, 429/247
See application file for complete search history.

(56) References Cited

U.S. PATENT DOCUMENTS

| | | | | |
|---|---|---|---|---|
| 4,517,264 A | * | 5/1985 | Miller et al. | 429/163 |
| 4,543,303 A | * | 9/1985 | Dantowitz et al. | 429/34 |
| 4,950,564 A | * | 8/1990 | Puglisi et al. | 429/101 |
| 5,114,807 A | * | 5/1992 | Rowlette | 429/152 |
| 5,663,007 A | * | 9/1997 | Ikoma et al. | 429/53 |
| 5,663,008 A | * | 9/1997 | Shimakawa et al. | 429/43 |
| 5,766,801 A | * | 6/1998 | Inoue et al. | 429/99 |
| 6,437,537 B2 | | 8/2002 | Park | |
| 6,815,113 B2 | * | 11/2004 | Franklin et al. | 429/34 |
| 2005/0170240 A1 | * | 8/2005 | German et al. | 429/120 |

FOREIGN PATENT DOCUMENTS

| | | |
|---|---|---|
| EP | 0 732 759 A1 | 9/1996 |
| JP | 09-120808 | 5/1997 |
| JP | 62-271362 | 11/1997 |
| JP | 2003-036819 | 2/2003 |
| JP | 2005-141935 | 6/2005 |
| KR | 1998-0009763 | 4/1998 |
| KR | 10-2006-0102661 | 9/2006 |

OTHER PUBLICATIONS

Patent Abstracts of Japan, Publication No. 62-271362, dated Nov. 25, 1997, in the name of Toru Goto et al.
Patent Abstracts of Japan, Publication No. 2005-141935, dated Jun. 2, 2005, in the name of Masahiro Kiyofuji et al.
Japanese Office action dated Feb. 2, 2010, for corresponding Japanese application 2006-206729.

* cited by examiner

*Primary Examiner* — Helen O Conley
(74) *Attorney, Agent, or Firm* — Christie, Parker & Hale, LLP

(57) ABSTRACT

A battery module including a plurality of unit batteries arranged in series, an end plate located at each end of the plurality of unit batteries, a plurality of connecting members connected to each end plate to fix the end plates to the unit batteries, and at least one reinforcing member on each end plate, the reinforcing member serving to enhance the resistance to bending of each end plate.

21 Claims, 10 Drawing Sheets

BATTERY MODULE

CROSS-REFERENCES TO RELATED APPLICATIONS

This application claims priority to and the benefit of Korean Patent Application Nos. 10-2005-0069442 and 10-2005-0069482 filed on Jul. 29, 2005, both applications filed in the Korean Intellectual Property Office, the entire content of which are incorporated herein by reference.

BACKGROUND OF THE INVENTION

1. Field of the Invention

The present invention relates to a battery module having end plates with increased resistance to bending.

2. Description of the Related Art

Recently, a high output rechargeable battery ("unit battery") using nonaqueous electrolyte and having a high energy density has been developed. High capacity batteries are used as the power source for driving motors, such as those of hybrid electric vehicles.

A high capacity secondary battery ("battery module") is composed of a plurality of unit batteries. The unit battery includes an electrode assembly having positive and negative electrodes and a separator interposed between the positive and negative electrodes, a case for receiving the electrode assembly, a cap assembly for sealing the case, and positive and negative terminals extending from the cap assembly and electrically connected to the positive and negative electrodes, respectively.

The unit batteries are arranged in series in a housing, spaced from each other by a predetermined distance, and have their terminals are connected. The unit batteries are securely fixed to each other to form a battery module.

In a conventional battery module, end plates are disposed adjacent end unit batteries of the battery module to allow a compressive force to be applied to the unit batteries, thereby fixing the unit batteries to each other. Connecting members such as restraint rods are screw-coupled to the end plates.

However, when the battery module is used for a long time, swelling occurs in the unit batteries causing the unit batteries to apply stress to the end plates. As a result, the end plates may be deformed and the connecting member may become unstably coupled from the end plates. Stress may become concentrated on the unstable coupling portion between the end plates and the connecting members, causing damage to the unstable coupling portion.

By increasing a thickness of the connecting member or the end plate, the above problem may be solved. However, a thicker connecting member results in an increase in the weight of the battery module, thus deteriorating the performance of the device powered by the battery module.

SUMMARY OF THE INVENTION

The present invention provides a battery module including end plates having an enhanced resistance to bending.

According to one exemplary embodiment of the present invention, a battery module is provided including a plurality of unit batteries arranged in series, an end plate located at each end of the plurality of unit batteries, a plurality of connecting members connected to each end plate to fix the end plates to the plurality of unit batteries, and at least one reinforcing member on each end plate, the at least one reinforcing member enhancing resistance to bending of each end plate.

The reinforcing member may be formed of an H-beam and arranged in parallel with an edge of the end plate. The reinforcing member may be fixed on the end plate by welding. The end plate may be provided at opposite side edges with holes through which the connecting members are inserted. A contacting portion contacts each end of the plurality of unit batteries and extending portions extend from the contacting portion and are connected to the connecting members.

The extending portions may correspond to sides of the unit battery and a height of the extending portion is substantially identical to the contacting portion. The extending portion may be ring-shaped.

The reinforcing member may be installed on only the contacting portion or on both the contacting and extending portions. The reinforcing member may be installed on and extend from a surface of the end plate. Alternatively, the reinforcing member may be formed of a wrinkled plate with a plurality of peaks and valleys. The peaks and valleys may be arc-shaped and alternately arranged in a direction such that the reinforcing member has a wave-shaped cross-section. The wave shaped cross section may be different shapes, such as rectangular or triangular. The peaks and valleys may be oriented in a direction perpendicular or parallel to a height of the battery module.

Two reinforcing members may be combined with one end plate and the reinforcing members may be disposed such that an orientation of the peaks and valleys of a first reinforcing member is perpendicular to the orientation of the peaks and valleys of a second reinforcing member.

The reinforcing member is provided with holes through which the connecting members are inserted. Portions of the reinforcing member around the holes may be formed to have flat surfaces. The connecting members may be restraint rods inserted through the holes and fixed on the reinforcing members by nuts.

DETAILED DESCRIPTION

Figure 1:
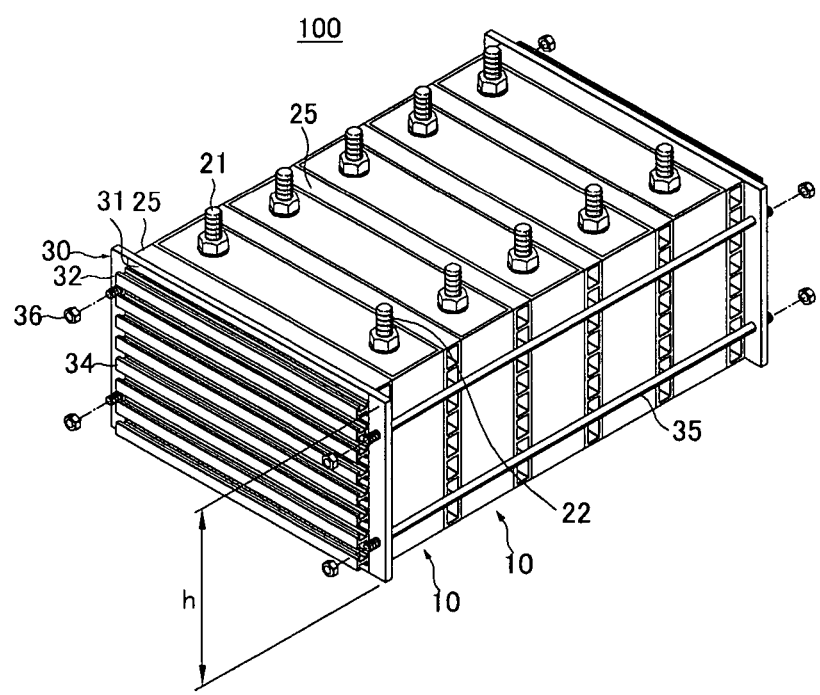
FIG. 1 is a perspective view of a battery module according to an exemplary embodiment of the present invention.
Figure 2:
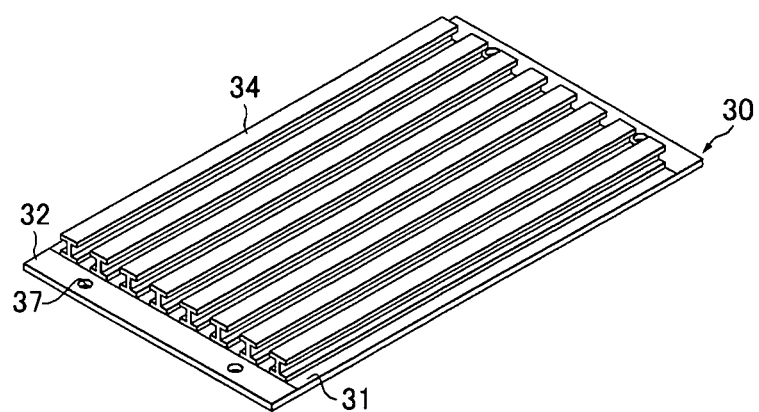
FIG. 2 is a perspective view of an end plate of the battery module of FIG. 1.

Referring to FIGS. 1 and 2, a battery module 100 of the present embodiment includes a plurality of unit batteries 10 and a plurality of barriers 25 disposed adjacent each planar surface of the unit batteries to provide coolant passages.

End plates 30 are installed adjacent each end unit battery to bookend the unit batteries 10 of the battery module 100. Each end plate 30 includes a contact portion 31 contacting a corresponding adjacent barrier 25 and extending portions 32 extending from the contact portion 31.

In one exemplary embodiment, a height of each extending portion 32 is identical to a height "h" of the contacting portion 31. However, the present invention is not limited to this case.

The end plates 30 are connected to each other by connecting members 35, such as restraint rods, to fix the unit batteries 10 and the barriers 25. In one exemplary embodiment, two connecting members 35 are installed on each extending portion 32 of each end plate 30. The extending portions 32 are provided with holes 37 (FIG. 2) through which the connecting members 35 are inserted. In one exemplary embodiment, each extending portion 32 is provided with two holes 37.

The end plates 30 are connected by the connecting members 35 inserted through the holes 37 and fixed by nuts 36 threaded to each end of each connecting member 36. The nuts 36 provided a compressive force to the battery module allowing the unit batteries 10 and the barriers 25 to be fixed to each other.

A reinforcing member 34 is installed on each of the end plates 30. In one exemplary embodiment, the reinforcing member 34 is formed on only the contact portion 31 of the end plate 30 so as not to interfere with coupling the connecting members 35 to the extending portions 32. As shown in FIG. 1, the reinforcing member 34 is formed on an exterior planar surface of the end plate 30 which does not contact a barrier 25.

The existence of the reinforcing member 34 on the exterior planar surface of the end plate 30 prevents stress concentration where the end plate 30 contacts the barrier 25 by preventing deformation of the end plate caused by expansion of the unit batteries 10. The reinforcing member 34 also effectively dissipates heat generated from the unit batteries 10 by increasing the heat transmission area of the end plate 30.

In this embodiment, the reinforcing member 34 includes a plurality of H-beams arranged on the outer surface of the end plate 30 at predetermined intervals. The reinforcing member 34 is fixed on the outer surface of the end plate 30 by, for example, welding. The number and size of H-beams of the reinforcing member 34 is not specifically limited and may be dictated by specifications for the battery module 100 to which the end plates 30 are applied.

Forming the reinforcing member 34 on the end plate 30 allows the thickness of the end plate 30 to be less than a conventional end plate. As a result, the end plate 30 is lighter than a conventional end plate, thus reducing a weight of the battery module as compared with a conventional battery module.

Figure 3:
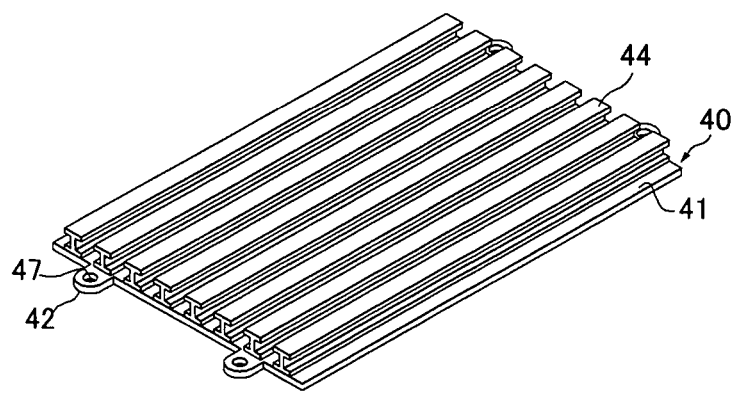
FIG. 3 is a perspective view of an alternate end plate and a reinforcing member of the present invention.

FIG. 3 is a perspective view of an alternate end plate 40. As shown in FIG. 3, the end plate 40 is substantially similar to the end plate 30 of FIG. 1. However, each extending portion 42 to which the connecting member is coupled is ring-shaped with a hole 47 through which the connecting member is insertable. Two ring-shaped extending portions 42 are formed on each end of a contact portion 41 of the end plate 40. Since the overall area of the extending portion 42 is less than the extending portion 32 of FIG. 1, the end plate 40 is lighter, thus reducing the weight of the battery module.

Figure 4:
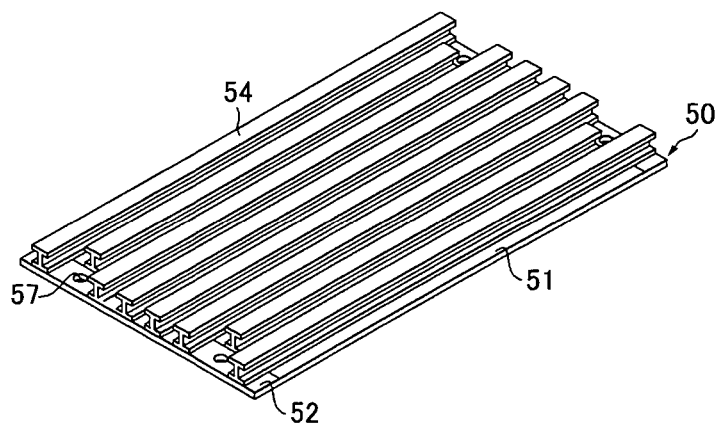
FIG. 4 is a perspective view of another alternate end plate of the present invention.

FIG. 4 is a perspective view of an alternate end plate 50 of the present invention. As shown in FIG. 4, a reinforcing member 54 is formed on both contacting and extending portions 51, 52 of the end plate 50. Holes 57 for coupling a connecting member are formed on the extending portions 52.

The end plate 50 effectively distributes stress applied to the extending portions 52 as well as stress applied to the contacting portion 51, preventing deformation of the end plate 50 by external force.

Figure 5:
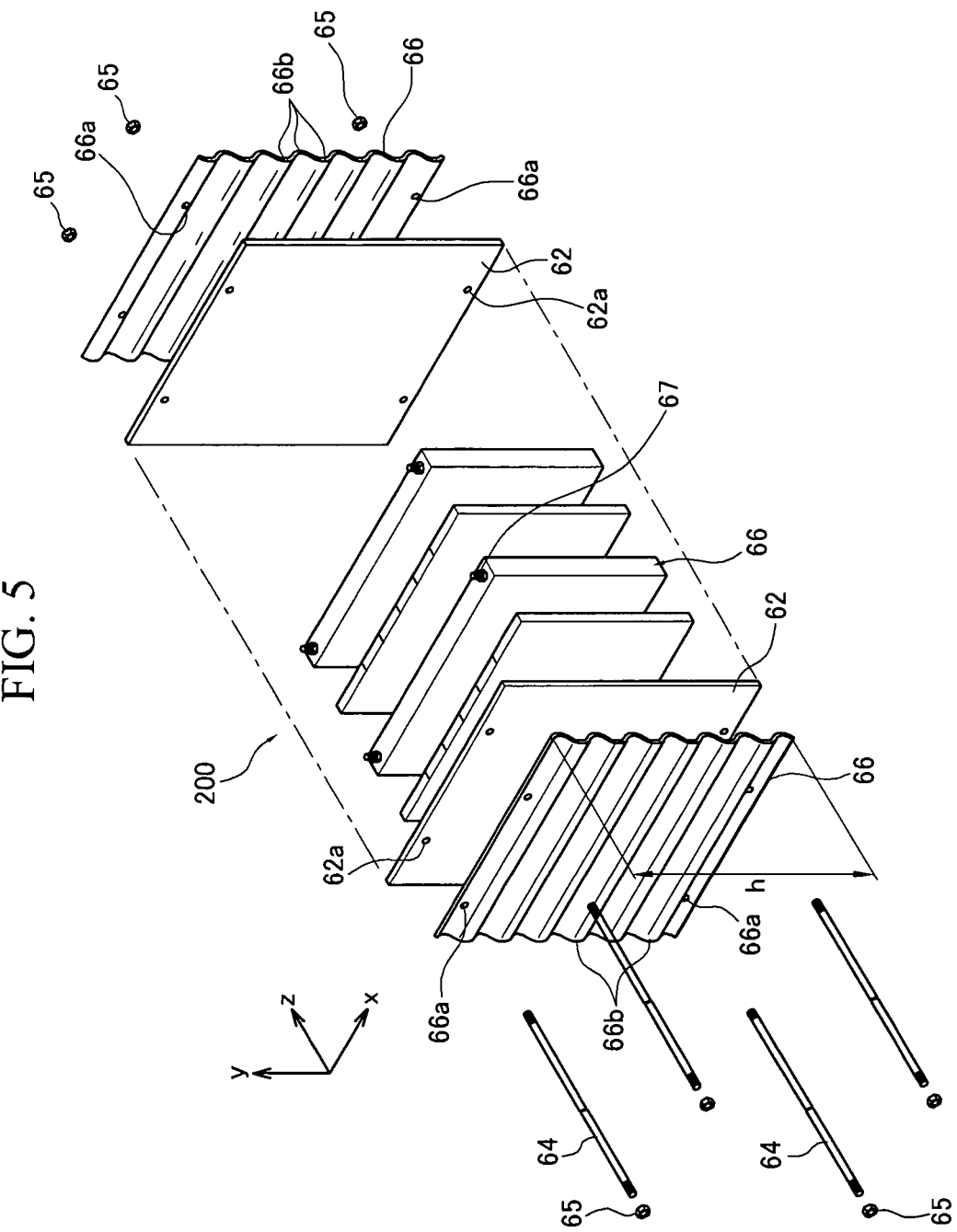
FIG. 5 is an exploded perspective view of a battery module according to another exemplary embodiment of the present invention.
Figure 6:
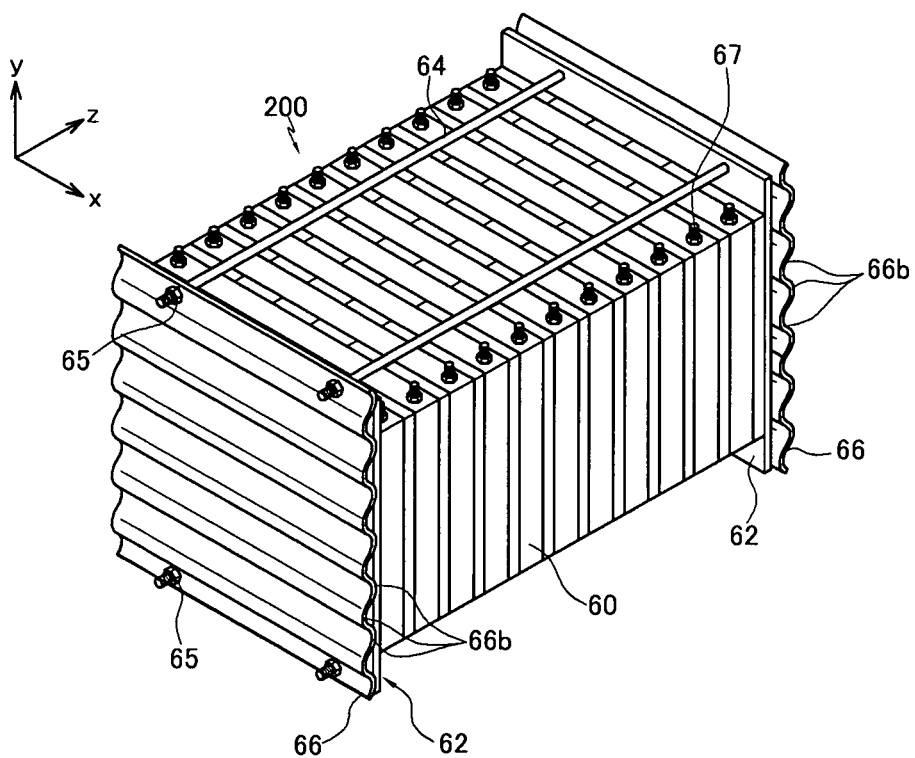
FIG. 6 is a perspective view of an assembled battery module of FIG. 5.

Referring to FIGS. 5 and 6, a battery module 200 includes a plurality of unit batteries 60 and end plates 62 disposed adjacent each end unit battery to bookend the unit batteries 60. Connecting members 64 are inserted through holes 62a, 66a in each end plate 62 and in the reinforcing member 66 is secured to the end plates 62 by nuts 65, thereby fixing the unit batteries 60 and the end plates 62.

A reinforcing member 66 formed as a wrinkled plate is installed on the end plate 62. The reinforcing member 66 may be coupled to the connecting members 62 such that it extends from the end plate 62. Alternatively, the reinforcing member 66 may be coupled to the connecting members 62 such that it is welded to the end plate 62.

Figure 8:
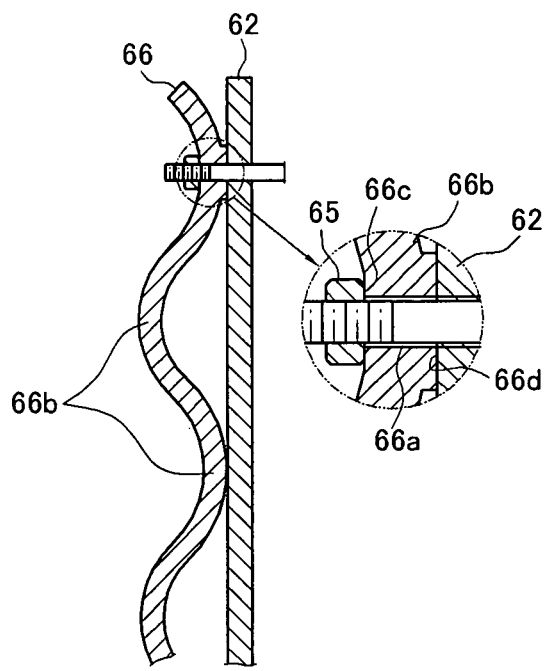
FIG. 8 is a partial side sectional view of an alternate embodiment of an end plate and a reinforcing member of the present invention.
Figure 9:
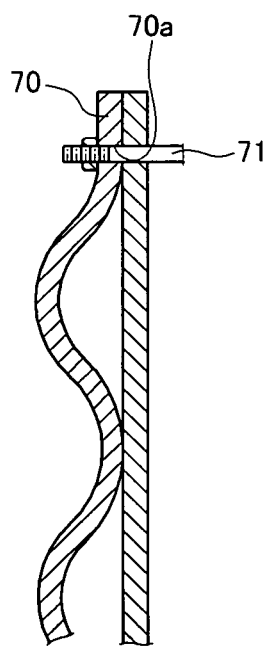
FIG. 9 is a partial sectional view of an alternate embodiment of an end plate and a reinforcing plate of the present invention.

The reinforcing member 66 is provided with a plurality of peaks and valleys 66b, giving the reinforcing member 66 a wave-shaped cross-section. The peaks and valleys 66b may be oriented in a horizontal direction (along an X-axis in FIG. 5) in parallel with each other. That is, the peaks and valleys 66b are oriented perpendicular to a height h of the battery module. In one exemplary embodiment as shown in FIG. 8, the peak or valley 66b where the nut is threaded to the connecting member 62 is flat. More specifically, at a portion of the reinforcing member 66 around each hole 66a, a first surface 66c contacting the nut 65 and a second surface 66d contacting the reinforcing member 66 are formed to be flat. Alternatively, as shown in FIG. 9, both side end portions of a reinforcing member 70, where holes 70a are formed to receive a connecting member 71 may be formed to be flat without having a peak or a valley.

Figure 7:
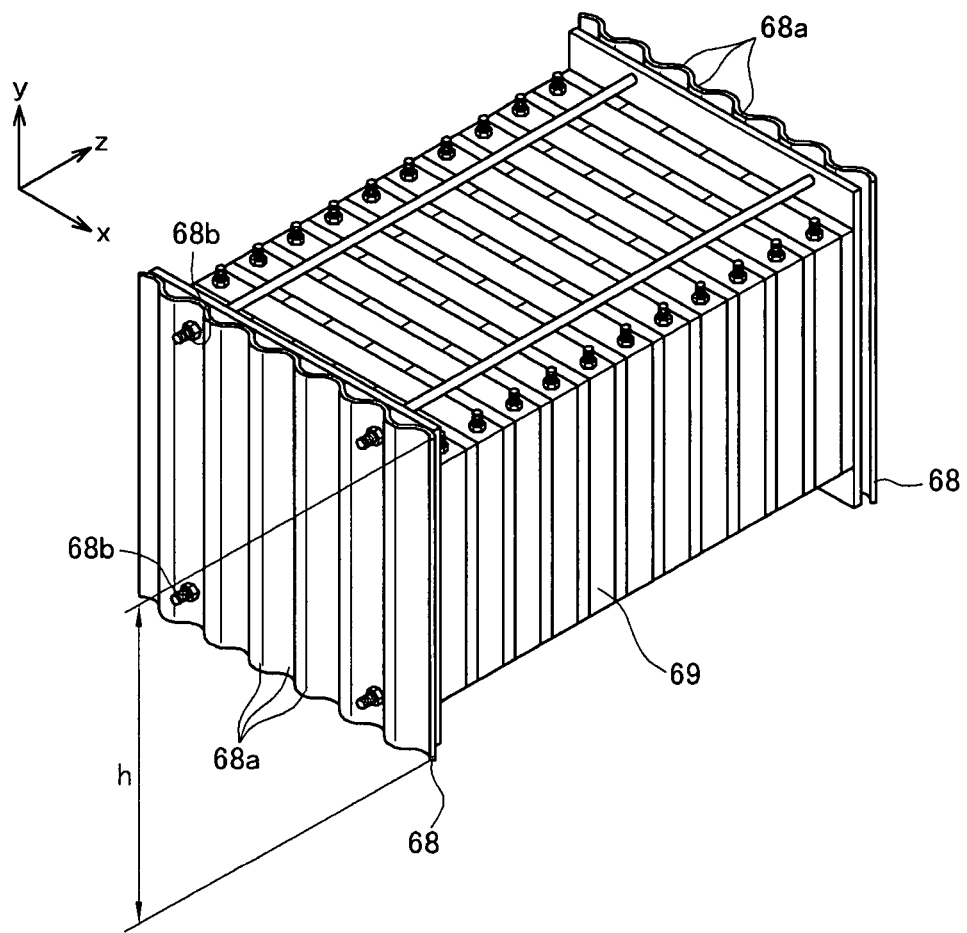
FIG. 7 is a perspective view of an alternate embodiment of a battery module of the present invention.

In another exemplary embodiment as shown in FIG. 7, the peaks and valleys 66b may be arranged in a vertical direction (along a Y-axis in FIG. 7). That is, the peaks and valleys 66b extend in a direction parallel to a height "h" of the battery module.

Figure 10:
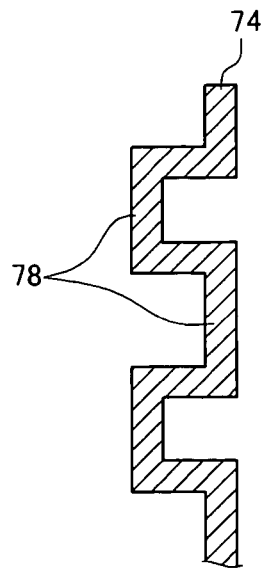
FIGS. 10 and 11 are sectional views of alternate embodiments of reinforcing members of the present invention.
Figure 11:
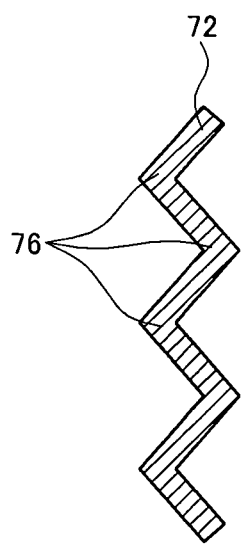

FIGS. 10 and 11 are sectional views of alternate configurations of reinforced members of the present invention. Referring to FIG. 10, peaks and valleys 76 of a reinforcing member 72 are formed to have a generally rectangular cross-section. That is, the elements making up the peaks and valleys 76 are perpendicular with respect to each other. Referring to FIG. 11, peaks and valleys 87 of a reinforcing member 74 are formed to have a generally triangular cross-section.

Figure 12:
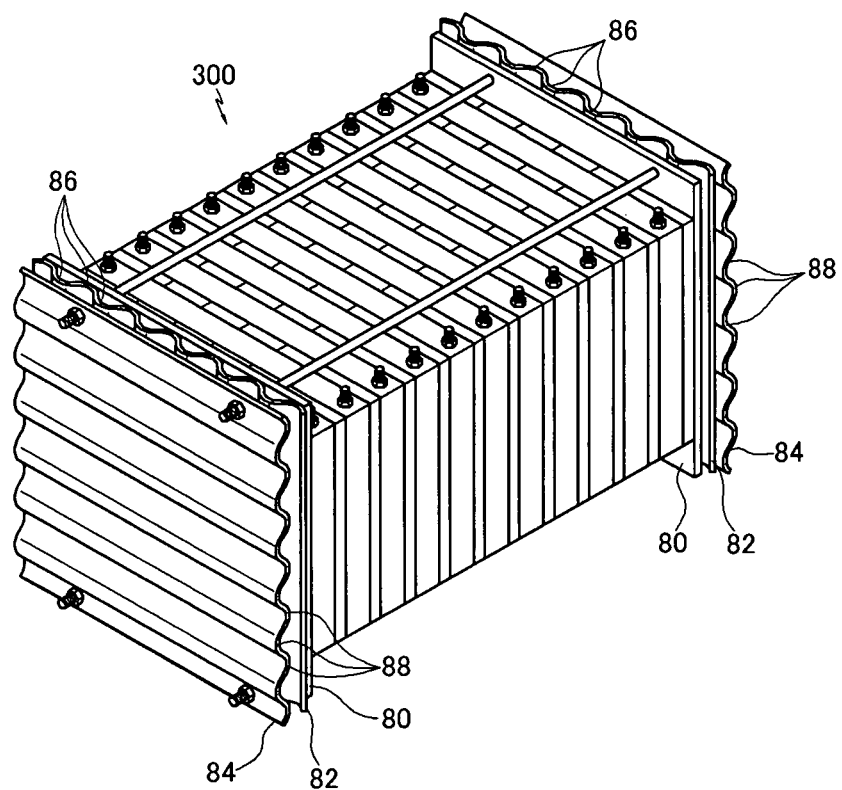
FIG. 12 is a perspective view of a battery module according to another exemplary embodiment of the present invention.
Figure 13:
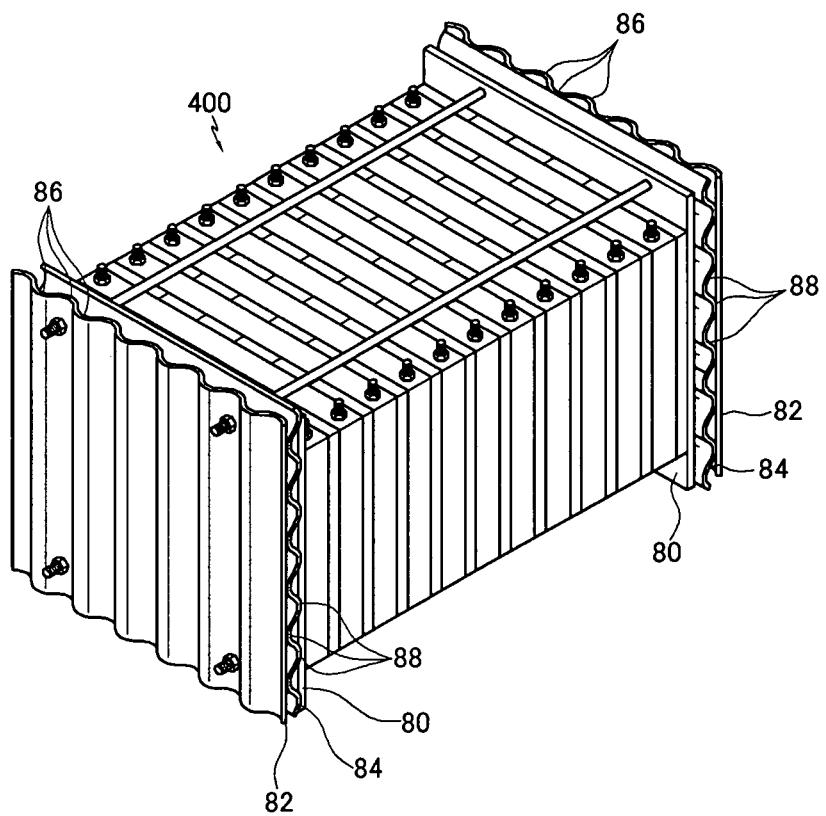
FIG. 13 is a perspective view of a battery module according to yet another exemplary embodiment of the present invention.

FIGS. 12 and 13 are perspective views of battery modules according to alternate embodiments of the present invention. In battery modules 300, 400 of these exemplary embodiments, two or more reinforcing members 82, 84 are combined with one end plate 80. The reinforcing members 82, 84 are disposed such that the direction of the peaks and valleys of a first reinforcing member is perpendicular to the direction of the peaks and valleys of a second reinforcing member.

The battery modules according to the foregoing embodiments can be used as the power source to drive motors, such as those for hybrid electric vehicles, electric vehicles, electric scooters, electric bicycles, wireless vacuum cleaners, or the like.

Although exemplary embodiments of the present invention have been shown and described, it will be appreciated by those skilled in the art that changes may be made to these embodiments without departing from the principles and spirit of the invention, the scope of which is defined in the claims and their equivalents.

What is claimed is:

1. A battery module comprising:
a plurality of unit batteries arranged in series;
end plates comprising a first end plate and a second end plate at respective side ends of the plurality of unit batteries, each of the end plates having a substantially planar surface and a plurality of holes extending through the substantially planar surface, wherein an edge of each of the end plates protrudes past an edge of a respective one of the unit batteries;
a plurality of connecting members connected to and extending between the first end plate and the second end plate to fix the first end plate and the second end plate to the plurality of unit batteries, wherein each of the connecting members protrudes through one of the holes on each of the end plates;
barriers spacing the first end plate and second end plate, respectively, from respective side end batteries of the unit batteries; and
at least one reinforcing member separate from and coupled to the substantially planar surface of each of the end plates, the at least one reinforcing member extending in a direction generally from a first edge to a second edge of a respective one of the end plates, wherein the at least one reinforcing member protrudes from the respective one of the end plates and wherein a portion of the at least one reinforcing member is entirely spaced from the respective one of the end plates, wherein a respective one of the end plates includes:
a contacting portion contacting the at least one reinforcing member, and
extending portions extending from the contacting portion, the extending portions adapted to be connected to at least one of the connecting members.

2. The battery module of claim 1, wherein the at least one reinforcing member is an H-beam.

3. The battery module of claim 1, wherein the at least one reinforcing member is substantially parallel to an edge of a respective one of the end plates.

4. The battery module of claim 1, wherein the at least one reinforcing member is welded to a respective one of the end plates.

5. The battery module of claim 1, wherein a height of each of the end plates is substantially the same as a height of each of the unit batteries.

6. The battery module of claim 1, wherein a height of the extending portions is substantially identical to a height of the respective one of the end plates.

7. The battery module of claim 1, wherein the extending portions comprise a ring-shaped groove.

8. The battery module of claim 1, wherein the at least one reinforcing member is coupled to the contacting portion.

9. The battery module of claim 1, wherein the at least one reinforcing member is coupled to the contacting portion and to the extending portions.

10. The battery module of claim 1, wherein the at least one reinforcing member is a corrugated plate having a plurality of peaks and valleys.

11. The battery module of claim 10, wherein the plurality of peaks and valleys are arc-shaped.

12. The battery module of claim 10, wherein the plurality of peaks and valleys are alternately arranged such that the at least one reinforcing member has a wave-shaped cross-section.

13. The battery module of claim 12, wherein the wave-shaped cross-section is generally rectangular.

14. The battery module of claim 12, wherein the wave-shaped cross-section is generally triangular.

15. The battery module of claim 10, wherein the plurality of peaks and valleys extend in a direction that is substantially perpendicular to a height of the battery module.

16. The battery module of claim 10, wherein the plurality of peaks and valleys extend in a direction that is substantially parallel to a height of the battery module.

17. The battery module of claim 10, wherein two reinforcing members are combined with each of the end plates and wherein the two reinforcing members are oriented such that the plurality of peaks and valleys of a first reinforcing member extend in a direction that is substantially perpendicular to a direction in which the plurality of peaks and valleys of a second reinforcing member extend.

18. The battery module of claim 10, wherein the at least one reinforcing member has holes adapted to receive the connecting members.

19. The battery module of claim 18, wherein a surface of the at least one reinforcing member adjacent to each of the holes is substantially flat.

20. The battery module of claim 18, wherein the plurality of connecting members are restraint rods that are fixed to a respective one of the reinforcing members by nuts.

21. The battery module of claim 1, wherein the at least one reinforcing member is removably coupled to the respective one of the end plates.

* * * * *